(12) United States Patent
You et al.

(10) Patent No.: US 12,463,277 B2
(45) Date of Patent: Nov. 4, 2025

(54) BATTERY PACK

(71) Applicant: CONTEMPORARY AMPEREX TECHNOLOGY (HONG KONG) LIMITED, Hong Kong (CN)

(72) Inventors: Kaijie You, Fujian (CN); Xingdi Chen, Fujian (CN); Yanhuo Xiang, Fujian (CN); Fenggang Zhao, Fujian (CN); Linggang Zhou, Fujian (CN); Peng Wang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 775 days.

(21) Appl. No.: 17/356,653

(22) Filed: Jun. 24, 2021

(65) Prior Publication Data

US 2021/0320359 A1    Oct. 14, 2021

Related U.S. Application Data

(63) Continuation of application No. PCT/CN2019/079502, filed on Mar. 25, 2019.

(30) Foreign Application Priority Data

Dec. 28, 2018  (CN) .......................... 201822237714.0

(51) Int. Cl.
*H01M 50/209*    (2021.01)
*H01M 50/148*    (2021.01)
(Continued)

(52) U.S. Cl.
CPC ....... *H01M 50/209* (2021.01); *H01M 50/204* (2021.01); *H01M 50/211* (2021.01);
(Continued)

(58) Field of Classification Search
CPC ............. H01M 50/209; H01M 50/204; H01M 50/211; H01M 50/271; H01M 50/543;
(Continued)

(56) References Cited

U.S. PATENT DOCUMENTS 10,014,560 B2    7/2018 Ju et al.
2013/0280565 A1*  10/2013 Lee ...................... H01M 50/211
                                                                429/151

(Continued)

FOREIGN PATENT DOCUMENTS

| CN | 206322750 U | 7/2017 |
| CN | 206564277 U | 10/2017 |
| EP | 3333935 A1 | 6/2018 |

OTHER PUBLICATIONS

International Search Report dated Sep. 27, 2019 issued in PCT/CN2019/079502.

(Continued)

Primary Examiner — Adam J Francis
(74) Attorney, Agent, or Firm — Scully, Scott, Murphy & Presser, P.C.

(57) ABSTRACT

The present application is provided with a battery pack, including a first battery module, a second battery module and a box body, where the first battery module and the second battery module are housed in the box body; the box body including a lower box body configured to support the first battery module and the second battery module, and an upper box body fitting with the lower box body. The lower box body includes a first connecting portion, and the first connecting portion is located between the first battery module and the second battery module. The upper box body includes a second connecting portion, where the first connecting portion and the second connecting portion are fixed and connected. In the battery pack of the present application, (Continued)

the problem of downward deflection of the lower box body is avoided and the strength of the battery pack is improved.

9 Claims, 6 Drawing Sheets

(51) Int. Cl.
 *H01M 50/204* (2021.01)
 *H01M 50/211* (2021.01)
 *H01M 50/271* (2021.01)
 *H01M 50/543* (2021.01)
(52) U.S. Cl.
 CPC ....... *H01M 50/271* (2021.01); *H01M 50/543* (2021.01); *H01M 50/148* (2021.01); *H01M 2220/20* (2013.01)
(58) Field of Classification Search
 CPC ............. H01M 50/148; H01M 50/244; H01M 50/249; H01M 50/296; H01M 50/507; H01M 50/242; H01M 2220/20; B60K 2001/0438; B60K 1/04; B60L 50/64; B60L 50/66
 See application file for complete search history.

(56) References Cited

U.S. PATENT DOCUMENTS

| | | | |
|---|---|---|---|
| 2014/0338999 A1* | 11/2014 | Fujii | B60L 58/26 |
| | | | 180/68.5 |
| 2016/0172715 A1 | 6/2016 | Ju et al. | |
| 2018/0316070 A1* | 11/2018 | Lee | H01M 50/224 |
| 2019/0157638 A1* | 5/2019 | Jung | H01M 50/204 |
| 2019/0291558 A1* | 9/2019 | Goto | H01M 50/209 |
| 2020/0044211 A1* | 2/2020 | Seo | H01M 50/242 |

OTHER PUBLICATIONS

Office Action dated Sep. 29, 2022 received in European Patent Application No. EP 19903378.8.

* cited by examiner

BATTERY PACK

CROSS-REFERENCE TO RELATED APPLICATIONS

This application is a continuation of International Application No. PCT/CN2019/079502, filed on Mar. 25, 2019, which claims priority to Chinese Patent Application No. 201822237714.0, filed on Dec. 28, 2018, both of which are hereby incorporated by reference in their entireties.

TECHNICAL FIELD

The present application relates to the field of batteries, and in particular, to a battery pack.

BACKGROUND

With the popularization of new energy vehicles, consumers' demand for new energy vehicles is becoming increasingly diversified. Among them, the demand for cruising range is considered to be one of the decisive and important factors whether many consumers are willing to accept new energy vehicles. In order to achieve greater cruising range, a volume of a battery pack is also increased to load more power.

At present, fixing points of the battery pack at the bottom of the vehicle are usually merely provided at the peripheries of a box body of the battery pack, and arranged around the outside of box body of the battery pack. That is, the fixing points are provided at the peripheries of an upper box body and the peripheries of a lower box body, to fix the upper box body and the lower box body together and hoist them at the bottom of the vehicle. When the battery pack becomes larger, this fixing method is a challenge for the structural strength of the entire battery pack. Insufficient strength of the battery pack fixed at the bottom of the vehicle will cause safety problems. For the purpose of satisfying the strength of the battery pack, the box body of the battery pack is always needed to be made strong enough, and the weight of the box body can be well distributed to each fixing point. Thus, the design of such box body directly causes great the difficulty and long cycle in designing, and requires constant simulation of the effect of the weight distribution on each fixing point. And to realize such a design scheme, it is designated to have disadvantages such as a large amount of welding, high cost, low energy density and unsightly appearance. Therefore, it is necessary to consider more effective ways to increase the strength of the battery pack fixed at the bottom of the vehicle.

SUMMARY

In view of the defects in the prior art, the purpose of the present application is to provide a battery pack, which can improve the strength of the battery pack, thereby making the battery pack suitable to be fixed at a bottom of a vehicle.

To achieve the foregoing objective, the present application is provided with a battery pack, including a first battery module, a second battery module, and a box body. The first battery module and the second battery module are housed in the box body. The box body includes a lower box body configured to support the first battery module and the second battery module; and an upper box body fitting with the lower box body. The lower box body includes a first connecting portion, where the first connecting portion is located between the first battery module and the second battery module. The upper box body includes a second connecting portion, and the first connecting portion and the second connecting portion are fixed and connected.

In an embodiment, the first connecting portion is provided at a bottom of the lower box body.

In an embodiment, the first connecting portion of the lower box body has a first protrusion portion protruding upward along a height direction, and the first protrusion portion of the first connecting portion is fixed and connected to the second connecting portion of the upper box body.

In an embodiment, the second connecting portion of the upper box body has a second protrusion portion protruding downward along the height direction, and the second protrusion portion of the second connecting portion is fixed and connected to the first connecting portion.

In an embodiment, the second connecting portion of the upper box body has a second protrusion portion protruding downward along the height direction, and the first protrusion portion of the first connecting portion is fixed and connected to the second protrusion portion of the second connecting portion.

In an embodiment, the first protrusion portion of the first connecting portion is formed with a first recess recessed inward along the height direction, and the first recess and the second protrusion portion of the second connecting portion are fixed and connected by concave-convex fit.

In an embodiment, the second protrusion portion of the second connecting portion is formed with a second recess recessed inward along the height direction, and the second recess and the first protrusion portion of the first connecting portion are fixed and connected by concave-convex fit.

In an embodiment, a top surface of the upper box body is provided with a third recess recessed inward along the height direction, which is corresponding to a position of the second protrusion portion of the second connecting portion.

In an embodiment, the battery pack further includes a connecting beam, provided between the first connecting portion and the second connecting portion, and the connecting beam is fixed and connected to the first connecting portion and the second connecting portion.

In an embodiment, the lower box body includes a first peripheral portion, the upper box body includes a second peripheral portion, and the first peripheral portion is fixed and connected to the second peripheral portion.

The beneficial effects of the present application are as follows: in the battery pack of the present application, the first connecting portion is provided between the first battery module and the second battery module, and the first connecting portion and the second connecting portion are fixed and connected, such that the strength of portions between the first battery module and the second battery module of the lower box body are improved. Therefore, the problem of the downward deflection of the lower box body is avoided and the strength of the battery pack is improved, such that the battery pack is suitable to be fixed at the bottom of the vehicle.

REFERENCE SIGNS:

| | |
|---|---|
| 1 First battery module | 312 First connecting portion |
| 2 Second battery module | 312A First protrusion portion |
| 3 Box body | 32 Upper box body |
| 31 Lower box body | 321 Second peripheral portion |
| 311 First peripheral portion | 322 Second connecting portion |
| 322A Second protrusion portion | F1 First fastening member |
| 4 Connecting beam | F2 Second fastening member |
| 5 Mounting beam | B Battery |
| R1 First recess | H Height direction |
| R2 Second recess | L Lengthwise direction |
| R3 Third recess | W Widthwise direction |

DESCRIPTION OF EMBODIMENTS

The accompany drawings show embodiments of the present application, and it will be understood that the disclosed embodiments are merely examples of the present application, and the present application can be implemented in various forms. Therefore, the specific details disclosed herein should not be interpreted as limiting, but merely as a basis of the claims and as a representative basis for teaching one skilled in the art to implement the present application in various ways.

Figure 1:
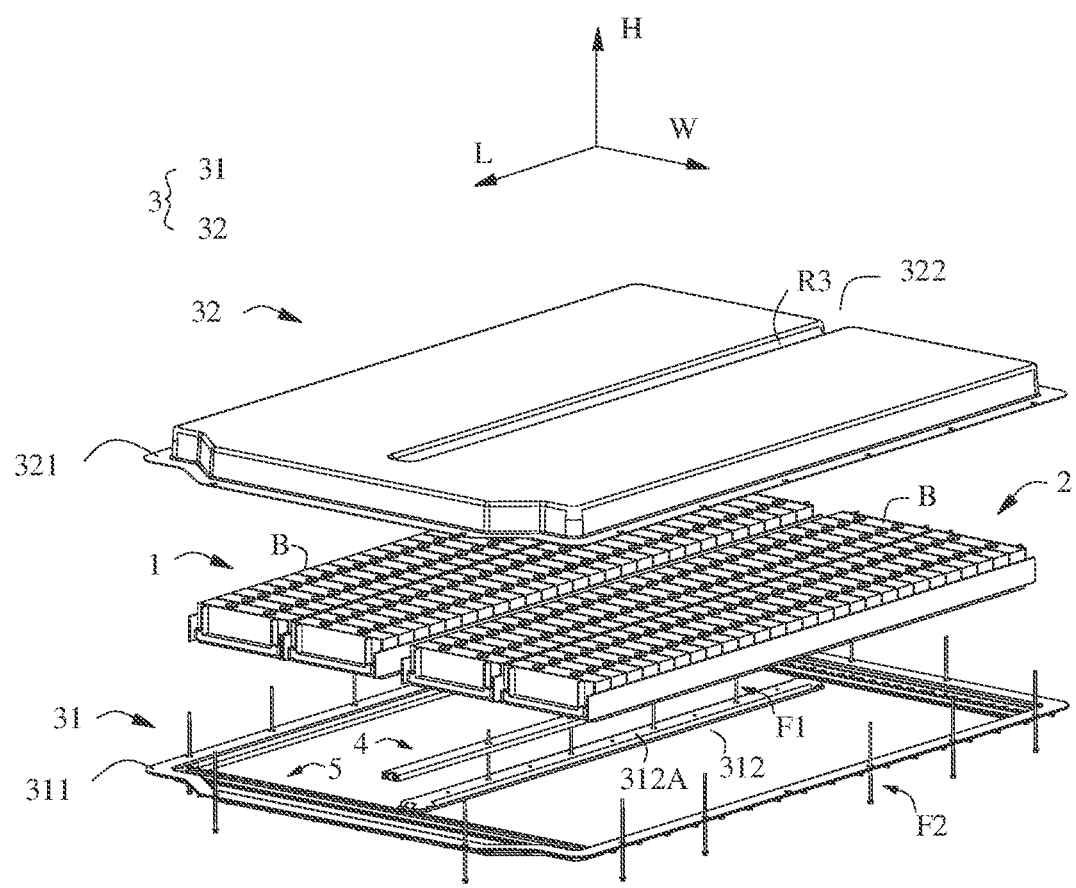
FIG. 1 is an exploded perspective view of an embodiment of a battery pack of the present application.
Figure 2:
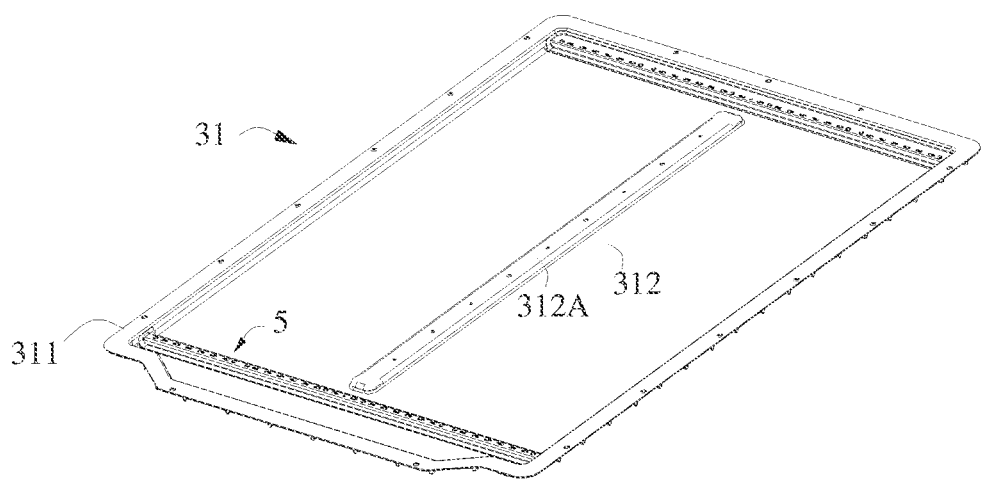
FIG. 2 is a perspective view of a lower box body of the battery pack of FIG. 1.
Figure 3:
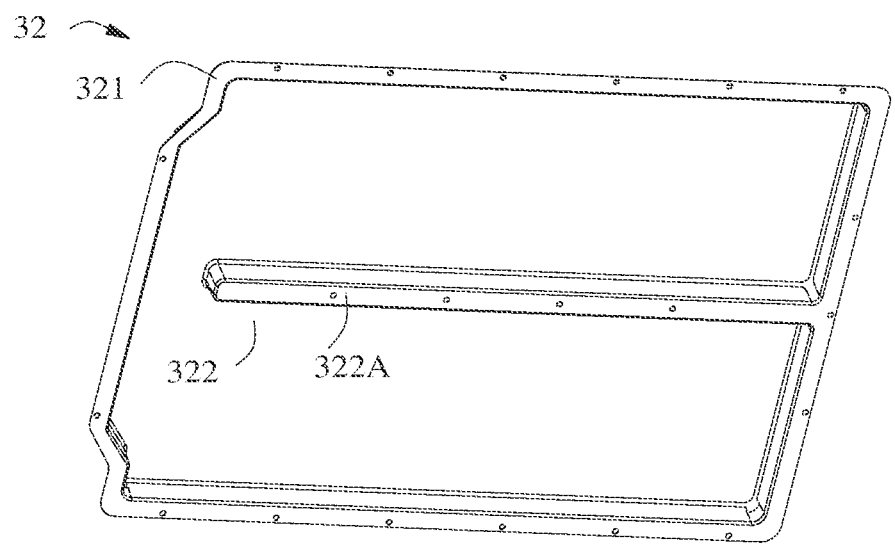
FIG. 3 is a top perspective view of an upper box body of the battery pack of FIG. 1.
Figure 4:
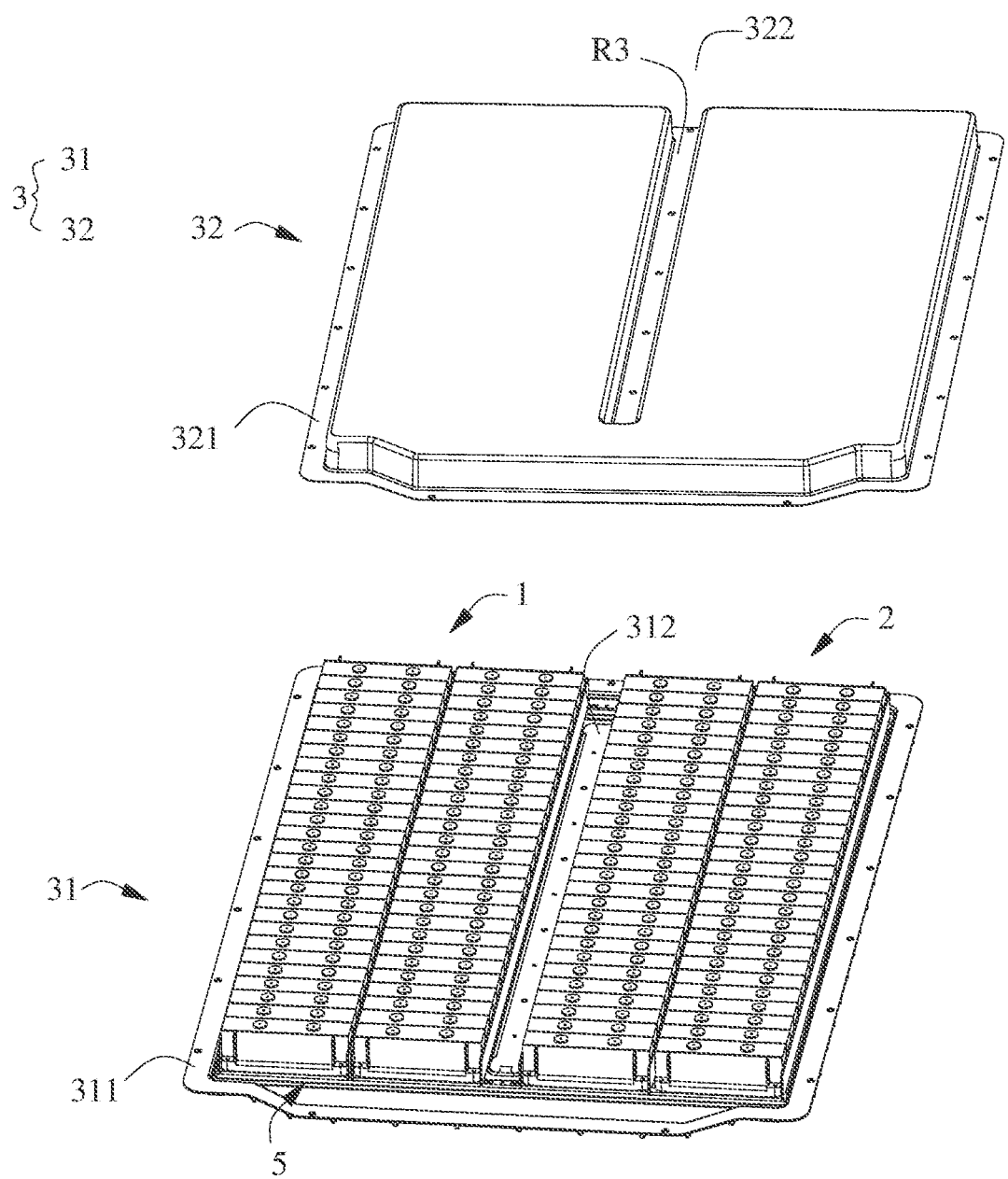
FIG. 4 is a perspective view of the battery pack of FIG. 1, where the upper box body is removed and a connecting beam not shown.
Figure 5:
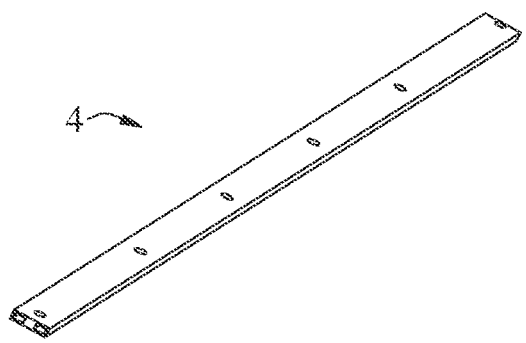
FIG. 5 is a perspective view of the connecting beam of the battery pack of FIG. 1.
Figure 6:
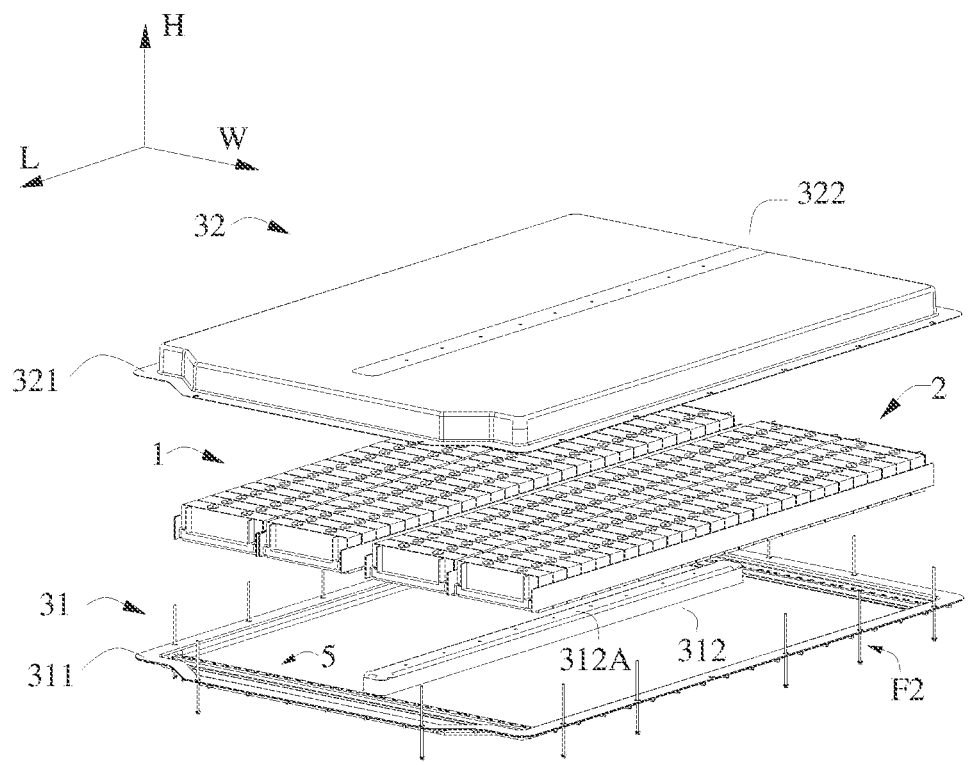
FIG. 6 is an exploded perspective view of another embodiment of the battery pack of the present application.
Figure 7:
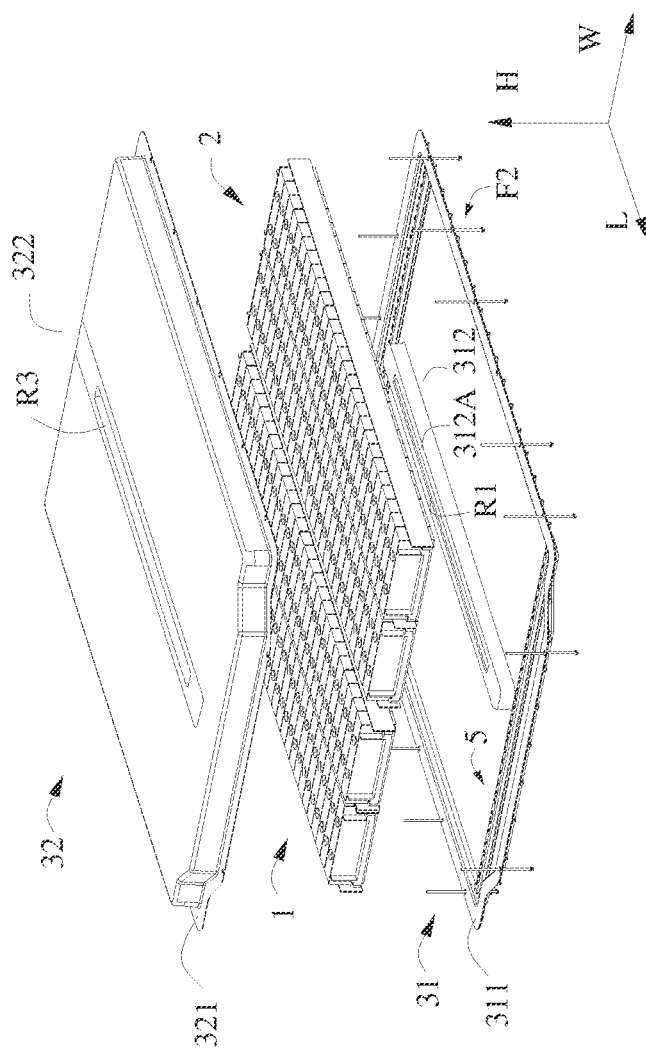
FIG. 7 is an exploded perspective view of yet another embodiment of the battery pack of the present application.
Figure 8:
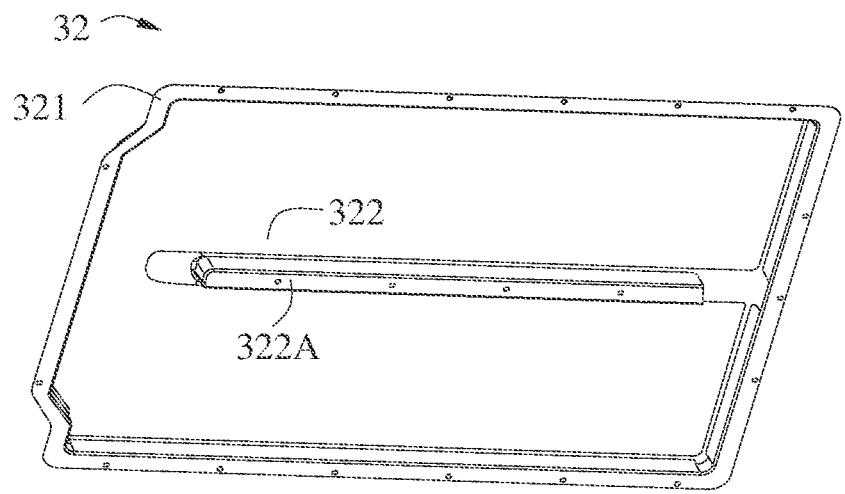
FIG. 8 is a top perspective view of the upper box body of the battery pack of FIG. 7 from another angle.
Figure 9:
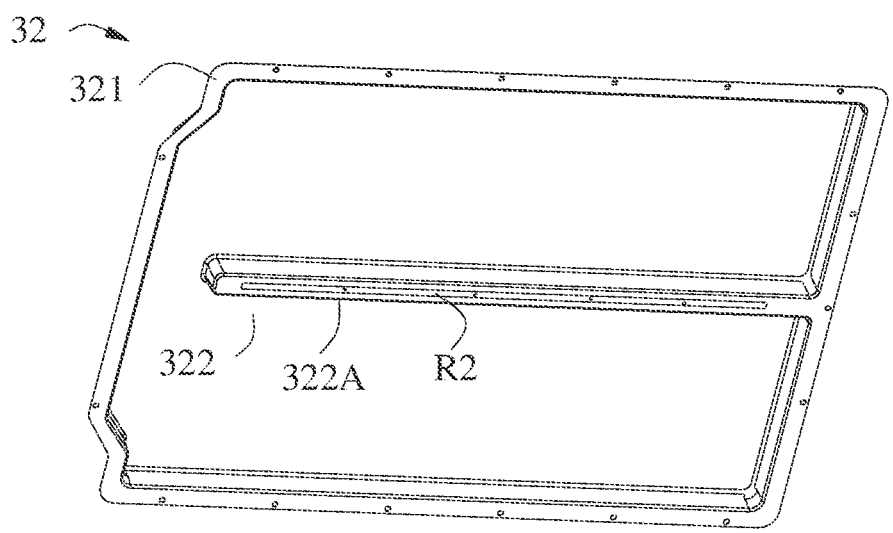
FIG. 9 is a top perspective view of another embodiment of the upper box body of the battery pack of the present application.

FIG. 1 is an exploded perspective view of an embodiment of a battery pack of the present application. FIG. 2 is a perspective view of a lower box body of the battery pack of FIG. 1. FIG. 3 is a top perspective view of an upper box body of the battery pack of FIG. 1. FIG. 4 is a perspective view of the battery pack of FIG. 1, where the upper box body is removed and a connecting beam not shown. FIG. 5 is a perspective view of the connecting beam of the battery pack of FIG. 1. FIG. 6 is an exploded perspective view of another embodiment of the battery pack of the present application. FIG. 7 is an exploded perspective view of yet another embodiment of the battery pack of the present application. FIG. 8 is a top perspective view of the upper box body of the battery pack of FIG. 7 from another angle. FIG. 9 is a top perspective view of another embodiment of the upper box body of the battery pack of the present application.

The battery pack of the present application includes a first battery module 1, a second battery module 2, a box body 3 and a connecting beam 4, where the first battery module 1 and the second battery module 2 are housed in the box body 3. The box body 3 includes a lower box body 31 configured to support the first battery module 1 and the second battery module 2, and an upper box body 32 fitting with the lower box body 31.

The lower box body 31 includes a first peripheral portion 311 and a first connecting portion 312. The first connecting portion 312 is located between the first battery module 1 and the second battery module 2. The upper box body 32 includes a second peripheral portion 321 and a second connecting portion 322. The first connecting portion 312 and the second connecting portion 322 are fixed and connected. The first peripheral portion 311 and the second peripheral portion 321 are connected and is configured to be hoisted at a bottom of a vehicle.

If the first connecting portion 312 is not designed to be provided between the first battery module 1 and the second battery module 2 and there is no fixation and connection between the first connecting portion 312 and the second connecting portion 322. Portions between the first battery module 1 and the second battery module 2 of the lower box body 31 will flex downward due to the dead weight of the first battery module 1 and the second battery module 2, such that the battery pack is unfavorable to be fixed at the bottom of the vehicle. However, in the battery pack of the present application, the first connecting portion 312 is provided between the first battery module 1 and the second battery module 2, and the first connecting portion 312 and the second connecting portion 322 are fixed and connected, such that the strength between the first battery module 1 and the second battery module 2 of the lower box body 31 is improved. Therefore, the downward deflection of the foregoing lower box body 31 is avoided and the strength of the battery pack is improved, such that the battery pack is suitable to be fixed at the bottom of the vehicle.

Besides, in addition to providing fixing points at the peripheries (first peripheral portion 311 and second peripheral portion 321) of the lower box body 31 and the upper box body 32 of the battery pack to fix and connect the lower box body 31 and the upper box body 32, and for hoisting at the bottom of the vehicle. The fixing points are also provided at the first connecting portion 312 of the lower box body 31 and the second connecting portion of the upper box body 32 to fix and connect, so as to further fix and connect the lower box body 31 and the upper box body 32. The first connecting portion 312 is located inside the lower box body 31 and the second connecting portion 322 of the upper box body 32 is correspondingly located inside the upper box body 32. The fixing points for hoisting at the bottom of the vehicle are added in the box body 3 in this way, such that the fixing points can be distributed in the entire space of the battery pack, which can effectively improve the strength of the battery pack fixed at the bottom of the vehicle.

Both the first battery module 1 and the second battery module 2 include a plurality of batteries B arranged along the lengthwise direction L. Battery B may be a hard-shell battery (or referred as can-type battery) or a soft package battery (or referred as a bag-type battery). The hard-shell battery includes an electrode assembly (not shown), a pole, an explosion-proof valve, a housing, and a top cover. A receiving cavity is formed inside the housing to contain the electrode assembly and electrolyte. The electrode assembly includes a positive electrode plate, a negative electrode plate, and a separator separating the positive electrode plate and the negative electrode plate. The electrode assembly may be formed by winding a positive electrode plate, a negative electrode plate, and a separator, or by laminating a positive electrode plate, a negative electrode plate, and a separator. Both the positive electrode plate and the negative electrode plate include a current collector and an active material layer arranged on the current collector. The soft package battery includes a packaging bag (for example, formed of aluminum-plastic film) as a battery housing, an electrode assembly (similar to the structure and molding of a hard-shell battery), and tabs. Part of the tabs is enclosed in the packaging bag and the other part extends out of the packaging bag. The tabs may be directly formed with electrode plate or use independent conductive materials and be electrically connected to the current collector.

With reference to FIG. 1, FIG. 4, FIG. 6 and FIG. 7, a mounting beam 5 is provided in the lower box body 31, and the first battery module 1 and the second battery module 2 are fixed to the mounting beam 5. The first battery module 1 and the second battery module 2 may be fixed to the mounting beam 5 by bolts, but it is not limited thereto, and other connection methods may also be used.

In the embodiment shown in the figure, the first connecting portion 312 is provided at a bottom of the lower box body 31. The first battery module 1 and the second battery module 2 may be fixed at the bottom of the lower box body 31 with structural glue.

With reference to FIGS. 1 to 4, in order to reliably fix and connect the first connecting portion 312 of the lower box body 31 and the second connecting portion 322 of the upper box body 32, the first connecting portion 312 of the lower box body 31 has a first protrusion portion 312A protruding upward along the height direction H, and the first protrusion portion 312A of the first connecting portion 312 is fixed and connected to the second connecting portion 322 of the upper box body 32. The second connecting portion 322 of the upper box body 32 has a second protrusion portion 322A protruding downward along the height direction H, and the first protrusion portion 312A of the first connecting portion 312 and the second protrusion portion 322A of the second connecting portion 322 are fixed and connected, such that the corresponding surfaces of the first connecting portion 312 and the second connecting portion 322 along the height direction H may be tightly fit and fixed.

The arrangement of the first protrusion portion 312A of the first connecting portion 312 and the second protrusion portion 322A of the second connecting portion 322 is not limited thereto. The first connecting portion 312 of the lower box body 31 may have a first protrusion portion 312A protruding upward along the height direction H and the first protrusion portion 312A of the first connecting portion 312 is fixed and connected to the second connecting portion 322 of the upper box body 32. The first protrusion portion 312A is provided to increase the thickness of the first connecting portion 312 in the height direction H, such that fixing surfaces of the first connecting portion 312 and the second connecting portion 222 are tightly fit with each other for reliable fixation. The structure of the second connecting portion 322 may be configured arbitrarily, so long as it can be fixed and connected to the first protrusion portion 312A of the first connecting portion 312. For example, in the embodiment shown in FIG. 6, the first connecting portion 312 has a first protrusion portion 312A, and the second connecting portion 322 is a plain surface. Similarly, the second connecting portion 322 of the upper box body 32 may has a second protrusion portion 322A protruding downward along the height direction H, and the second protrusion portion 322A of the second connecting portion 322 is fixed and connected to the first connecting portion 312, which also can achieve the same effect of the first connecting portion 312 and the second connecting portion 322 being tightly fit with each other. The structure of the first connecting portion 312 may be configured arbitrarily, so long as it can be fixed and connected to the second protrusion portion 322A of the second connecting portion 322.

With reference to the embodiment shown in FIGS. 7 to 9, the first connecting portion 312 and the second connecting portion 322 may be fixed and connected by matching the shape. In the embodiment shown in FIG. 7 and FIG. 8, the first protrusion portion 312A of the first connecting portion 312 is formed with a first recess R1 recessed inward along the height direction H, and the first recess R1 and the second protrusion portion 322A of the second connecting portion 322 are fixed and connected by concave-convex fit. The arrangement may be reversed. In the embodiment shown in FIG. 9, the second protrusion portion 322A of the second connecting portion 322 is formed with a second recess R2 recessed inward along the height direction H, and the second recess R2 and the first protrusion portion 312A of the first connecting portion 312 are fixed and connected by concave-convex fit. Through the first recess R1 and the second protrusion portion 322A shape-matching with the first recess R1, or the second recess R2 and the first protrusion portion 312A shape-matching with the second recess R2, the first connecting portion 312 and the second connecting portion 322 are tightly fit with each other for fixation and connection.

The structure of the first connecting portion 312 and the second connecting portion 322 is not limited thereto, as long as the two can be reliably fixed and connected.

With reference to the embodiment shown in FIG. 1, FIG. 4, and FIG. 7, when the second connecting portion 322 has a second protrusion portion 322A, a top surface of the upper box body 32 is provided with a third recess R3 that is recessed inward along the height direction H. The third recess R3 corresponds to a position of the second protrusion portion 322A of the second connecting portion 322, such that the thickness of the upper box body 32 at the second protrusion portion 322A is reduced. On one hand, the weight of the upper box body 32 may be reduced, and on the other hand, the thickness of the position for fixation and connection of the first connecting portion 312 and the second connecting portion 322 along the height direction H is reduced, to reduce the force applied at the position for fixation and connection.

With reference to FIG. 1 and FIG. 5, the connecting beam 4 is provided between the first connecting portion 312 and the second connecting portion 322. The connecting beam 4 is fixed and connected to the first connecting portion 312 and the second connecting portion 322 to improve the strength of the fixation and connection between the first connecting portion 312 and the second connecting portion 322. The way of fixing of the connecting beam 4 is not unique. The connecting beam 4 may be fixed to the first connecting portion 312 of the lower box body 31, or the second connecting portion 322 of the upper box body 32, or the mounting beam 5, so as to improve the overall strength of the lower box body 31. The arrangement of the connecting beam 4 is not necessary. There are other ways to improve the strength instead of arranging the connecting beam 4.

With reference to FIG. 1, the battery pack further includes a first fastening member F1. The first connecting member 312 of the lower box body 31 and the second connecting member 322 of the upper box body 32 are fixed and connected by the first fastening member F1 along the height direction H. When the battery pack includes the connecting beam 4, the connecting beam 4, the first connecting member 312 of the lower box body 31 and the second connecting member 322 of the upper box body 32 are fixed and connected by the first fastening member F1. The first fastening member F1 may be a connecting member such as a bolt, a screw, or a snap pin. Further, a sealant or gasket may be added between the first connecting portion 312 and the second connecting portion 322, or among the connecting beam 4, the first connecting portion 312 and the second connecting portion 322, to fix and connect with the first fastening member F1, achieving sealing and fixation. The first fastening member F1 may be omitted as needed, and glue (for example, structural glue) is used to fix and connect the first connecting portion 312 and the second connecting portion 322, or the connecting beam 4, the first connecting portion 312 and the second connecting portion 322.

With reference to FIG. 1, FIG. 6 and FIG. 7, the battery pack further includes a second fastening member F2. The first peripheral portion 311 of the lower box body 31 and the second peripheral portion 321 of the upper box body 32 are fixed and connected by the second fastening member F2 along the height direction H. The second fastening member F2 may be a connecting member such as a bolt, a screw, or a snap pin. Further, a sealant or a gasket may be added between the first peripheral portion 311 and the second peripheral portion 321, to fix and connect with the second fastening member F2, achieving sealing and fixation. The second fastening member F2 may be omitted as needed, and glue (such as structural glue) is used to fix and connect the first peripheral portion 311 and the second peripheral portion 321.

Finally, it is added that the lower box body 31 may be add with reinforcing ribs (not shown) to improve the structural strength of the battery pack.

The above detailed description depicts a few exemplary embodiments, but the present application is not intended to be limited to the explicitly disclosed combinations. Therefore, unless otherwise stated, the various features disclosed herein can be combined to form multiple additional combinations that are not shown for the purpose of brevity.

The above are merely preferred embodiments of this application and are not intended to limit this application. For those skilled in the art, this application may have various modifications and variations. Any modification, equivalent substitution, improvement, or the like, made within the spirit and principle of the present application, shall fall within the protection scope of the present application.

What is claimed is:

1. A battery pack, comprising a first battery module, a second battery module and a box body, wherein the first battery module and the second battery module are housed in the box body;
    wherein the box body comprises a lower box body configured to support the first battery module and the second battery module, and an upper box body fitting with the lower box body, wherein the upper box body is a recess structure with an opening facing downwards towards the lower box body, and the lower box body is a recess structure with an opening facing upwards towards the upper box body; the opening of the upper box body engages with the opening of the lower box body;
    a bottom wall of the lower box body comprises a first connecting portion, the first connecting portion is located between the first battery module and the second battery module, a bottom wall of the upper box body comprises a second connecting portion, and the first connecting portion and the second connecting portion are fixed and connected;
    wherein the first connecting portion of the lower box body has a first protrusion portion protruding upward along a height direction, and the first protrusion portion of the first connecting portion is fixed and connected to the second connecting portion of the upper box body; and,
    wherein the second connecting portion of the upper box body has a second protrusion portion protruding downward along the height direction, the second protrusion portion, the second connecting portion, and the upper box body are an integral structure, and the first protrusion portion of the first connecting portion is fixed and connected to the second protrusion portion of the second connecting portion;
    the battery pack further comprises:
    a first fastening member, the first protrusion portion of the first connecting portion and the second protrusion portion of the second connecting portion are fixed and connected by the first fastening member along the height direction.

2. The battery pack according to claim 1, wherein the first connecting portion is provided at a bottom of the lower box body.

3. The battery pack according to claim 1, wherein the first protrusion portion of the first connecting portion is formed with a first recess recessed inward along the height direction, and the first recess and the second protrusion portion of the second connecting portion are fixed and connected by concave-convex fit.

4. The battery pack according to claim 1, wherein the second protrusion portion of the second connecting portion is formed with a second recess recessed inward along the height direction, and the second recess and the first protrusion portion of the first connecting portion are fixed and connected by concave-convex fit.

5. The battery pack according to claim 1, wherein a top surface of the upper box body is provided with a third recess recessed inward along the height direction, which is corresponding to a position of the second protrusion portion of the second connecting portion.

6. The battery pack according to claim 1, wherein the second connecting portion of the upper box body has a second protrusion portion protruding downward along a height direction, and the second protrusion portion of the second connecting portion is fixed and connected to the first connecting portion.

7. The battery pack according to claim 6, wherein a top surface of the upper box body is provided with a third recess recessed inward along the height direction, which is corresponding to a position of the second protrusion portion of the second connecting portion.

8. The battery pack according to claim 1, wherein the battery pack further comprises a connecting beam, provided between the first connecting portion and the second connecting portion, and the connecting beam is fixed and connected to the first connecting portion and the second connecting portion.

9. The battery pack according to claim 1, wherein the lower box body comprises a first peripheral portion, the upper box body comprises a second peripheral portion, and the first peripheral portion is fixed and connected to the second peripheral portion.

* * * * *